UNITED STATES PATENT OFFICE.

EMANUEL FELHEIM, OF LICHTENRADE, NEAR BERLIN, GERMANY.

HOMOGENEOUS DURABLE MIXTURE OF COCOA AND CALCIUM CHLORIDE AND PROCESS FOR PRODUCING THE SAME.

1,411,618.    Specification of Letters Patent.    Patented Apr. 4, 1922.

No Drawing.    Application filed July 16, 1920. Serial No. 396,871.

*To all whom it may concern:*

Be it known that I, EMANUEL FELHEIM, a citizen of Germany, residing at Lichtenrade, near Berlin, Germany, have invented certain new and useful Improvements in Homogeneous Durable Mixtures of Cocoa and Calcium Chloride and Processes for Producing the Same, (for which I have filed an application in Germany, July 3, 1919,) of which the following is a specification.

By experiments continued for many years Loew and Emmerich disclosed the excellent therapeutic effects of calcium chloride ("Aerztliche Rundschau," 1915, No. 35). But up to the present many obstacles have opposed the general application of calcium chloride as a medicine. Calcium chloride was prescribed either in solutions which, on account of their salty taste, were repugnant to the patient, or in the form of tablets which could not be deprived of their exceedingly troublesome tendency to melt when exposed to the air, and which, in spite of taste-improving agents being admixed with them, continued to retain the nauseous flavour of calcium chloride.

By my invention I have succeeded in adding calcium chloride to cocoa in an easily dispensed form and in such a manner that the final product is proof against moisture, and the bitter taste of the calcium chloride counteracted in consequence of the perfectly even distribution of the same and of the fact that a suitable proportion of the quantities of the cocoa and salt of lime is selected.

In accordance with the invention a concentrated solution of calcium chloride is prepared (30 parts of anhydrous calcium chloride for 50 cubic centimeters of solution) and this solution is permitted to be absorbed by the cocoa. An addition of 3% of calcium chloride to the cocoa will generally be sufficient for therapeutic purposes when it is administered regularly. If desired, the mixture is then dried at a moderate temperature, either by a warm air current or in a vacuum. High temperatures should be avoided so as to obviate the decomposition of the cocoa or the spoiling of its taste.

That it should be possible to prepare a compound of cocoa and calcium chloride in this way is astonishing because, when a solution of calcium chloride is added to dissolved cocoa a precipitate occurs. This gives the beverage a disagreeable appearance and renders it repugnant to the patient. Besides it is not possible in this way to veil the extremely unpleasant taste of the calcium chloride. The present invention constitutes the first successful solution of the problem of incorporating calcium chloride in cocoa. The calcium chloride is chemically bound in the cocoa so that a precipitation of albumen can no longer occur when a cocoa powder prepared in this manner is dissolved. Calcium organically bound in this manner is retained by the body, whereas simple solutions of calcium generally leave it without producing any useful effect.

To avoid the necessity of moving very large quantities about, it is advisable to use only an aliquot part of the cocoa for absorbing the calcium chloride solution and to add the mixture thus obtained to the unaltered surplus of the cocoa. Prior to this latter operation the said mixture may be dried and pulverized.

Example.

Three kilograms of finely ground cocoa are dissolved in water to form 5 litres of solution and to this 17 kgs, of finely ground cocoa are added whilst stirring. In this operation the liquid will be completely absorbed so that a powder which is practically dry is obtained. To make it perfectly dry an additional drying operation may be carried out. The mixture of cocoa and calcium chloride thus obtained is then added to, and well mixed with, 80 kgs, of non-treated cocoa. The product is then finished and may be used as a nutrient for the intended therapeutic purposes. It has been found by experience that, if the above directions are observed, the resulting product will retain its original dryness, even if it is exposed to the air for a long period of time.

The process herein described, when carried out as directed, always results in a permanently non-hygroscopic readily absorbable and soluble dry powdered calcareous nutrient, of agreeable taste and appetizing in appearance free of precipitated albumen comprising, in greater part, an albuminous chemical and colloidal combination of calcium chloride. While other mixtures of calcium chloride are known, these do not have the advantageous qualities above stated and have never been formed by adding to dry undissolved cocoa a concentrated solution of anhydrous calcium chloride.

The described process may also be applied to other compounds of halogen and calcium.

I claim:

1. A chemical composition comprising calcium chloride and dry cocoa.

2. A calcium chloride and cocoa composition comprising calcium chloride, cocoa and about 70 per cent of a chemical combination of calcium chloride and cocoa.

3. A process for producing a calcareous nutrient, consisting in adding to undissolved dry cocoa a concentrated solution of calcium chloride.

4. A process for producing a permanently non-hygroscopic readily absorbable and soluble dry powdered calcareous nutrient of agreeable taste and appetizing in appearance comprising in greater part a chemical combination of calcium chloride, said process consisting in adding to dry undissolved cocoa a concentrated solution of 30 parts of anhydrous calcium chloride for 50 cubic centimeters of solution.

In testimony whereof I affix my signature in presence of two witnesses.

Dr. EMANUEL FELHEIM.

Witnesses:
GUSTAVA ZASDO,
CARL LAMBRECHT.